United States Patent
Zhu et al.

(10) Patent No.: US 10,852,445 B2
(45) Date of Patent: Dec. 1, 2020

(54) UNMANNED AERIAL VEHICLE COMMUNICATION METHOD AND DEVICE AND UNMANNED AERIAL VEHICLE

(71) Applicant: Goertek Inc., Weifang (CN)

(72) Inventors: Jian Zhu, Weifang (CN); Xiangdong Zhang, Weifang (CN); Zhenyu Yu, Weifang (CN); Zhiping Luo, Weifang (CN); Dong Yan, Weifang (CN)

(73) Assignee: GOERTEK INC., Weifang (CN)

( * ) Notice: Subject to any disclaimer, the term of this patent is extended or adjusted under 35 U.S.C. 154(b) by 182 days.

(21) Appl. No.: 16/095,876

(22) PCT Filed: Jun. 8, 2018

(86) PCT No.: PCT/CN2018/090404
§ 371 (c)(1),
(2) Date: Oct. 23, 2018

(87) PCT Pub. No.: WO2019/085480
PCT Pub. Date: May 9, 2019

(65) Prior Publication Data
US 2020/0257003 A1    Aug. 13, 2020

(30) Foreign Application Priority Data

Oct. 30, 2017    (CN) .......................... 2017 1 1036642

(51) Int. Cl.
*G01S 19/42*    (2010.01)
*G01S 19/41*    (2010.01)
(Continued)

(52) U.S. Cl.
CPC ............ *G01S 19/42* (2013.01); *B64C 39/024* (2013.01); *G01S 19/071* (2019.08); *G01S 19/41* (2013.01);
(Continued)

(58) Field of Classification Search
CPC ........ G01S 19/42; G01S 19/071; G01S 19/41; H04W 4/40; H04W 4/023; H04B 7/18506;
(Continued)

(56) References Cited

U.S. PATENT DOCUMENTS 5,650,770 A    7/1997    Schlager et al.
9,273,981 B1 *  3/2016    Downey ............... B64C 39/024
(Continued)

FOREIGN PATENT DOCUMENTS

CN    106535308 A    3/2017
CN    107004345 A    8/2017
(Continued)

OTHER PUBLICATIONS

Wang Yongsheng, "Design and Implementation of Real-Time Position Differential GPS," Journal of Northwestern Polytechnical University, vol. 12, No. 3, Aug. 1994.

*Primary Examiner* — Harry K Liu
(74) *Attorney, Agent, or Firm* — Fox Rothschild LLP; Carol E. Thorstad-Forsyth (57) ABSTRACT

An unmanned aerial vehicle (UAV) communication method and device and a UAV are disclosed. The method comprises: acquiring position information of the UAV and position information of a ground station, wherein the ground station and the UAV are communicated wirelessly; determining a distance between the UAV and the ground station according to the position information of the UAV and the position information of the ground station; determining an operating mode of a power amplifier on the UAV according to the distance and a preset distance judgment rule, wherein the distance judgment rule stores correspondences between distance thresholds and operating modes of the power amplifier; and sending a control signal corresponding to the operating mode to the power amplifier, controlling the (Continued)

power amplifier to select a gain parameter threshold corresponding to the operating mode according to the control signal and to perform power amplification of a RF transmitting signal according to the gain parameter threshold; and sending the amplified signal to the ground station.

16 Claims, 3 Drawing Sheets (51) Int. Cl.
G01S 19/07 (2010.01)
G08G 5/00 (2006.01)
G05D 1/00 (2006.01)
B64C 39/02 (2006.01)
H04B 1/04 (2006.01)
H04W 4/02 (2018.01)
H04W 4/40 (2018.01)
H04B 7/185 (2006.01)

(52) U.S. Cl.
CPC ......... *G05D 1/0022* (2013.01); *G08G 5/0013* (2013.01); *G08G 5/0069* (2013.01); *H04B 1/04* (2013.01); *H04B 7/18506* (2013.01); *H04W 4/023* (2013.01); *H04W 4/40* (2018.02); *H04B 2001/0416* (2013.01)

(58) Field of Classification Search
CPC ... B64C 39/024; G05D 1/0022; G08G 5/0069
USPC ..................................................... 342/357.25
See application file for complete search history.

(56) References Cited

U.S. PATENT DOCUMENTS

| 9,588,516 | B1* | 3/2017 | Gurel ..................... G06T 5/002 |
| 2004/0113794 | A1 | 6/2004 | Schlager et al. |
| 2016/0007358 | A1* | 1/2016 | Yanagisawa ...... H04W 72/0406 |
| | | | 370/329 |
| 2019/0002103 | A1* | 1/2019 | Gomez Gutierrez ... A63F 13/20 |
| 2019/0028974 | A1* | 1/2019 | Wang ................... H04W 52/10 |
| 2019/0101620 | A1* | 4/2019 | Reis ......................... G01S 3/00 |

FOREIGN PATENT DOCUMENTS

| CN | 108011659 A | 5/2018 |
| CN | 207603640 U | 7/2018 |

\* cited by examiner

UNMANNED AERIAL VEHICLE COMMUNICATION METHOD AND DEVICE AND UNMANNED AERIAL VEHICLE

CROSS REFERENCE TO RELATED APPLICATIONS

This application is a U.S. National Stage entry under 35 U.S.C. § 371 based on International Application No. PCT/CN2018/090404, filed on Jun. 8, 2018, which was published under PCT Article 21(2) and which claims priority to Chinese Patent Application No. 201711036642.7, filed on Oct. 30, 2017. The disclosure of the priority applications are hereby incorporated herein in their entirety by reference.

TECHNICAL FIELD

The present disclosure relates to the technical field of unmanned aerial vehicles (UAVs), and more particularly to an unmanned aerial vehicle (UAV) communication method and device and a UAV.

BACKGROUND

A pilotless aircraft, also referred to as UAV, is commonly used in aerial photography, geographical mapping, real-time monitoring of traffic, inspection of power supply lines, and spraying of pesticides. With the development of UAV technology, more and more electronic devices are added to UAVs. On the one hand, the electronic devices newly added to UAVs improve the performance of UAVs, but on the other hand, they increase the power consumption of UAVs and reduce the flight endurance of UAVs.

The existing UAVs comprise the following key electronic devices: a propeller motor, a radio frequency (RF) communication transmitting module, a master control system chip, a camera, sensors and a RF communication receiving module, which are arranged in order of increasing power consumption.

Among the various electronic devices of UAVs, RF communication transmitting modules, especially a data transmission RF module for transmitting flight state data, etc. and an image transmission RF module for transmitting image data, video data, etc. collected by the UAV which are operated at 5.8 GHz, consume a large amount of power. Due to the influence of external environment, a 5.8 GHz signal is attenuated severely, and the power amplifier itself has the problem of power amplifier efficiency. It is often necessary to use a high power amplifier of 32 dBm in order to ensure that the flight state data and collected image data of the UAV can be transmitted back to the ground station over a long distance. When the data transmission RF module and the image transmission RF module generate RF transmitting signals simultaneously, the power consumption of the power amplifier for the power amplification of the RF transmitting signals of the two modules is as high as about 10 W, which greatly reduces the flight endurance of the UAV.

Such a high power amplifier can enable the communication distance between the RF transmitting module and the ground station to reach over 1 km. However, in practical applications, UAVs also work in close range. For example, a UAV may be tens of meters away from an operator at the ground station. In this case, the RF transmission power of image transmission and data transmission is only over ten dBm, and the actual power consumption is less than 1 W. If a high power amplifier is still used, that will result in a waste of energy.

SUMMARY

In order to solve the problems of the existing UAVs that the power consumption of power amplifier is large and the flight endurance is short, the present disclosure provides a UAV communication method and device and a UAV.

An embodiment of the present disclosure provides a UAV communication method, comprising:

acquiring position information of the UAV and position information of a ground station, wherein the ground station and the UAV are communicated wirelessly;

determining a distance between the UAV and the ground station according to the position information of the UAV and the position information of the ground station;

determining an operating mode of a power amplifier on the UAV according to the distance and a preset distance judgment rule, wherein the distance judgment rule stores correspondences between distance thresholds and operating modes of the power amplifier; and sending a control signal corresponding to the operating mode to the power amplifier, controlling the power amplifier to select a gain parameter threshold corresponding to the operating mode according to the control signal and to perform power amplification of a RF transmitting signal according to the gain parameter threshold; and sending the amplified signal to the ground station.

Another embodiment of the present disclosure provides a UAV communication device, comprising a processor and a memory which are communicatively connected via an internal bus, wherein the memory stores a computer program executable by the processor, and when the computer program is executed by the processor, the following steps are carried out:

acquiring position information of the UAV and position information of a ground station, wherein the ground station and the UAV are communicated wirelessly;

determining a distance between the UAV and the ground station according to the position information of the UAV and the position information of the ground station;

determining an operating mode of a power amplifier on the UAV according to the distance and a preset distance judgment rule, wherein the distance judgment rule stores correspondences between distance thresholds and operating modes of the power amplifier; and sending a control signal corresponding to the operating mode to the power amplifier, controlling the power amplifier to select a gain parameter threshold corresponding to the operating mode according to the control signal and to perform power amplification of a RF transmitting signal according to the gain parameter threshold; and sending the amplified signal to the ground station.

Still another embodiment of the present disclosure provides a UAV, comprising: a processor, a power amplifier and an antenna, wherein the processor is configured to acquire position information of the UAV and position information of a ground station, wherein the ground station and the UAV are communicated wirelessly; determine a distance between the UAV and the ground station according to the position information of the UAV and the position information of the ground station; determine an operating mode of a power amplifier on the UAV according to the distance and a preset distance judgment rule, wherein the distance judgment rule stores correspondences between distance thresholds and operating modes of the power amplifier; and sending a control signal corresponding to the operating mode to the power amplifier;

the power amplifier is configured to select a gain parameter threshold corresponding to the operating mode according to the control signal, and perform power amplification of a RF transmitting signal according to the gain parameter threshold, and the antenna is configured to send the amplified signal to the ground station.

The advantageous effects of the embodiments of the present disclosure are as follows. According to the present disclosure, the distance between the UAV and the ground station is determined by acquiring the position information of the UAV and the position information of the ground station; the operating mode of the power amplifier of the UAV is determined according to the distance and the preset distance judgment rule; after the operating mode of the power amplifier of the UAV is determined, a control signal is sent to the power amplifier, and the power amplifier is controlled to perform power amplification of the RF transmitting signals according to the gain parameter threshold corresponding to the operating mode.

Unlike the technical solutions of the prior art in which high power amplifiers are always used to ensure that the flight state data and the collected image data of the UAV can be transmitted back to the ground station over a long distance, in the present disclosure, the distance between the UAV and the ground station is firstly determined, and the operating mode of the power amplifier can be dynamically adjusted according to the actual distance between the UAV and the ground station, so that when the UAV transmits data to the ground station, the most suitable gain parameter threshold can be selected to perform power amplification of the RF transmitting signal. For example, when the distance between the UAV and the ground station is small, the power amplifier is controlled to operate in a low power operating mode; and when the distance between the UAV and the ground station is large, the power amplifier is controlled to operate in a high power operating mode. Thereby, the transmission quality of the RF transmitting signal can be ensured, and at the same time, the power consumption of the power amplifier can be reduced, and the flight endurance of the UAV can be increased.

DETAILED DESCRIPTION

To make the objectives, technical solutions and advantages of the present disclosure clearer, the embodiments of the present disclosure will be further described in detail with reference to the accompanying drawings.

Figure 1:
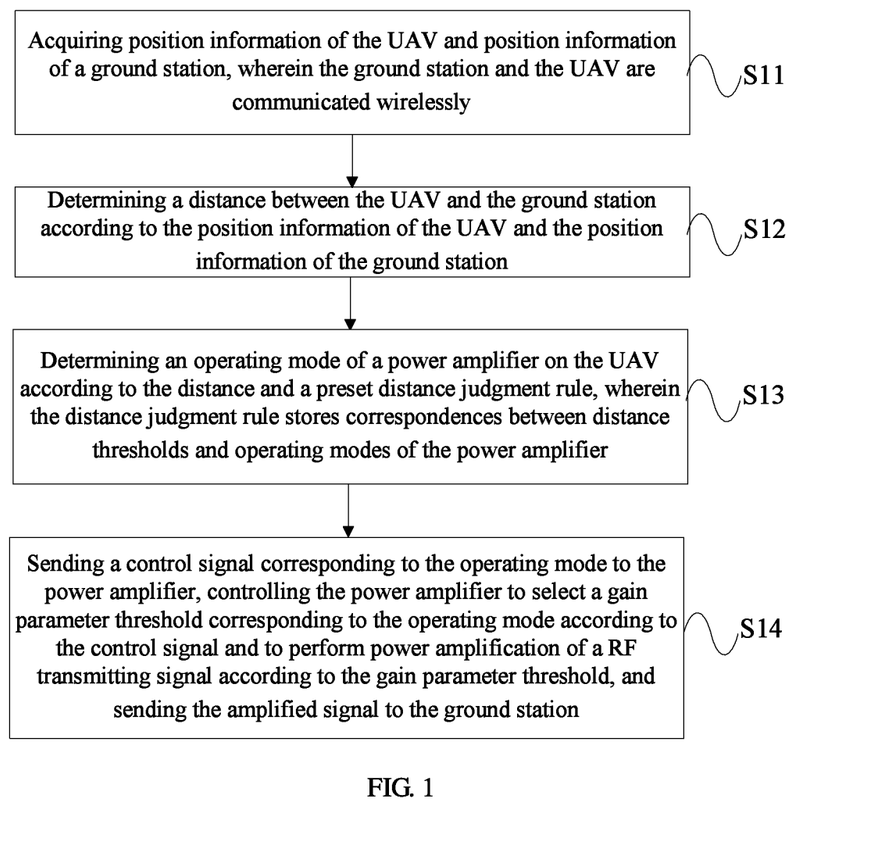
FIG. 1 is a schematic flowchart of a UAV communication method according to an embodiment of the present disclosure.

FIG. 1 is a schematic flowchart of a UAV communication method according to an embodiment of the present disclosure. As shown in FIG. 1, the method according to the embodiment of the present disclosure comprises the following steps:

S11: acquiring position information of the UAV and position information of a ground station, wherein the ground station and the UAV are communicated wirelessly.

In practical applications, the position information of the UAV and the position information of the ground station may be acquired based on the Global Positioning System (GPS), and they may be acquired in other manners, which is not limited in the present disclosure.

S12: determining a distance between the UAV and the ground station according to the position information of the UAV and the position information of the ground station.

In practical applications, the position information comprises latitude information, longitude information and altitude information. A spatial rectangular coordinate system is established with the center of the earth as the origin, the direction pointing to the north pole as the Z axis, the direction pointing to the intersection point of the initial meridian and the equator line as the X axis, and the direction perpendicular to the plane where the X axis and the Z axis lie as the Y axis.

In the embodiment of the present disclosure, the distance between the UAV and the ground station refers to the straight line distance between the UAV and the ground station. A first spatial coordinate of the UAV is determined by the latitude information, the longitude information and the altitude information of the UAV, a second spatial coordinate of the ground station is determined by the latitude information, the longitude information and the altitude information of the ground station, and then the straight line distance between the UAV and the ground station is determined according to the first spatial coordinate and the second spatial coordinate.

S13: determining an operating mode of a power amplifier on the UAV according to the distance and a preset distance judgment rule.

It should be noted that the distance judgment rule stores correspondences between distance thresholds and operating modes of the power amplifier.

S14: sending a control signal corresponding to the operating mode to the power amplifier, controlling the power amplifier to select a gain parameter threshold corresponding to the operating mode according to the control signal and to perform power amplification of the RF transmitting signal according to the gain parameter threshold; and sending the amplified signal to the ground station.

It should be noted that when the distance threshold is larger, the gain parameter threshold of the power amplifier corresponding to the operating mode is larger, and the output power of the power amplifier is larger if the input powers are the same.

Unlike the technical solutions of the prior art in which high power amplifiers are always used to ensure that the flight state data and the collected image data of the UAV can be transmitted back to the ground station over a long distance, in the UAV communication method according to the embodiment of the present disclosure, the distance between the UAV and the ground station is firstly determined, and the operating mode of the power amplifier can be dynamically adjusted according to the actual distance between the UAV and the ground station, so that when the UAV transmits data to the ground station, the most suitable gain parameter threshold can be selected to perform power amplification of the RF transmitting signal. For example, when the distance between the UAV and the ground station is small, the power amplifier is controlled to operate in a low power operating mode; and when the distance between the UAV and the ground station is large, the power amplifier is controlled to operate in a high power operating mode. Thereby, the transmission quality of the RF transmitting signal can be ensured, and at the same time, the power consumption of the power amplifier can be reduced, and the flight endurance of the UAV can be increased.

In an embodiment of the present disclosure, operating modes of the power amplifier include a first operating mode, a second operating mode and a third operating mode, wherein the gain parameter threshold of the first operating mode is less than the gain parameter threshold of the second operating mode, and the gain parameter threshold of the second operating mode is less than the gain parameter threshold of the third operating mode.

At this point, the step of determining an operating mode of a power amplifier on the UAV according to the distance and a preset distance judgment rule comprises:

when the distance is less than or equal to a first distance threshold, determining the operating mode of the power amplifier to be the first operating mode;

when the distance is greater than the first distance threshold but less than a second distance threshold, determining the operating mode of the power amplifier to be the second operating mode; and when the distance is greater than or equal to the second distance threshold, determining the operating mode of the power amplifier to be the third operating mode.

In the UAV communication method according to the embodiment of the present disclosure, the operating modes of the power amplifier are divided into a first operating mode (low power operating mode), a second power operating mode (medium power operating mode) and a third power operating mode (high power operating mode). After acquiring the distance between the UAV and the ground station, the distance is compared with a preset distance threshold to determine the operating mode of the power amplifier, thereby achieving dynamic adjustment of the operating mode of the power amplifier according to the distance.

In practical applications, the method of FIG. 1 is used to adjust the operating mode of the power amplifier according to the distance judgment rule in Table 1.

TABLE 1

| Distance Judgment Rule | |
| --- | --- |
| Distance threshold | Operating mode |
| 0-100 m | Low power |
| 100-300 m | Medium power |
| ≥300 m | High power |

Specifically, when the distance between the UAV and the ground station is 0-100 m, a control signal of low power operating mode is sent to the power amplifier; when the distance between the UAV and the ground station is 100-300 m, a control signal of medium power operating mode is sent to the power amplifier; and when the distance between the UAV and the ground station is ≥300 m, a control signal of high power operating mode is sent to the power amplifier.

In practical applications, the output power of the power amplifier in the first operating mode may be 12 dBm, the output power of the power amplifier in the second operating mode may be 22 dBm, and the output power of the power amplifier in the third operating mode may be 32 dBm. The output powers at each level of the operating modes differ by 10 dB (10 times power difference), and the 10 times power difference is equivalent to over 3 times the frequency coverage. It should be noted that the output powers of the power amplifier in the different operating modes may be set to other values, which is not limited in the present disclosure.

The spatial attenuation degree of the wireless communication signal between the UAV and the ground station is different in different flight environments. For example, the spatial attenuation degree of the wireless communication signal increases gradually from an open environment to an ordinary environment and further to a complex urban environment. Specifically, in an open environment, the wireless communication signal between the UAV and the ground station is not blocked, the wireless communication path between the two is similar to a straight line, and the loss generated during the transmitting of the wireless communication signal from the UAV to the ground station is very small. In a complex urban environment, the wireless communication signal between the UAV and the ground station is blocked by buildings, trees, etc., and a series of reflection and diffraction will occur during the transmitting of the wireless communication signal from the UAV to the ground station, which results in a great loss of the wireless communication signals. In an ordinary environment, the loss generated during the transmitting of the wireless communication signal from the UAV to the ground station is greater than that in an open environment, but less than that in a complex urban environment.

Therefore, in order to set different gain parameter thresholds of the power amplifier with respect to the different flight environments to ensure the transmission quality of the RF transmitting signal of the UAV in the different flight environments, in an alternative embodiment of the present disclosure, the distance judgment rule further includes environment attributes (environmental attributes refer to the flight environment characteristics of the UAV), and the method further comprising:

acquiring flight environment information of the UAV; and determining an environment attribute which the flight environment information belongs to according to the flight environment information, and selecting a distance judgment rule corresponding to the environment attribute which the flight environment information belongs to.

In the embodiment of the present disclosure, the flight environment refers to the flight site where the UAV is located, such as an open space with a wide field of view and few space obstacles (such as few buildings), a complex city with a large number of space obstacles (such as high density buildings), etc. In the embodiment of the present disclosure, the environment attribute of the flight environment information refers to the environmental characteristics that affect the attenuation degree of the wireless communication signal of the UAV in the spatial transmission process. For example, the influence of an open environment on the space attenuation of the wireless communication signal of the UAV is small, the influence of a complex urban environment on the spatial attenuation of the wireless communication signal is large, and the influence of an ordinary environment is greater than that of an open environment but less than that of a complex urban environment.

In practical applications, the spatial attenuation degree of the wireless communication signal may be determined based on the intensity of the signal transmitted by the UAV and the intensity of the signal received by the ground station, and then a distance judgment rule corresponding to the spatial attenuation degree may be selected.

In addition, the flight environment information of the UAV may be determined based on the image data sent from the UAV to the ground station, and it is judged whether the UAV is flying in an open environment or a complex urban environment, and then a distance judgment rule corresponding to the flight environment information is selected. Alternatively, a distance judgment rule corresponding to the environment attribute is directly selected according to the environment attribute input by the user. Here, the user's input operation may be inputting remotely through a smart device carried by the user, or setting the environment attributes by manually controlling the environment selection switch and the like on the UAV before releasing the UAV, which is not limited in the present disclosure.

During the flight of the UAV, the flight stability and locating accuracy may cause calculation errors of the distance. At this point, the distance between the UAV and the ground station may frequently change around a switching threshold of a certain distance threshold. For example, the difference between the distance between the UAV and the ground station and the switching threshold (critical value or endpoint of an interval) of a certain distance threshold of the power amplifier corresponding to a certain operating mode is less than a preset distance difference, or, when the change trend of the distance between the UAV and the ground station switches, for example, from distance increasing to distance decreasing, the difference between the distance between the UAV and the ground station at the starting point of the switching and the distance between the unmanned aerial vehicle and the ground station at the ending point of the switching is less than a preset distance difference. In these cases, if the distance judgment rule as shown in Table 1 is still used, the power amplifier may switch operating modes frequently and the so-called ping-pong effect may occur. For example, when the distance between the UAV and the ground station is 98 m, the operating mode of the power amplifier is the low power operating mode. When the distance increases from 98 m to 101 m, the operating mode of the power amplifier is switched from the low power operating mode to the medium power operating mode. When the distance between the UAV and the ground station decreases from 101 m to 99 m, the operating mode of the power amplifier is switched from the medium power operating mode to the low power operating mode again. When the distance changes frequently between 101 m and 99 m, the operating mode of the power amplifier on the UAV will also be frequently switched between the low power operating mode and the medium power operating mode, which affects the service life of the power amplifier and also increases the energy consumption.

In order to avoid the ping-pong effect, in an embodiment of the present disclosure, the distance judgment rule further includes distance change trend attributes, and the method further comprises:

acquiring a distance change trend of the distance between the UAV and the ground station within a preset duration; and selecting a distance judgment rule corresponding to the distance change trend according to the distance change trend.

Here, the distance change trends include distance increasing and distance decreasing; and the step of determining an operating mode of a power amplifier on the UAV according to the distance and a preset distance judgment rule particularly comprising:

in the case that the distance between the UAV and the ground station increases, when the distance is less than or equal to the first distance threshold, determining the operating mode of the power amplifier to be the first operating mode, when the distance is greater than the first distance threshold but less than the second distance threshold, determining the operating mode of the power amplifier to be the second operating mode, and when the distance is greater than or equal to the second distance threshold, determining the operating mode of the power amplifier to be the third operating mode; and in the case that the distance between the UAV and the ground station decreases, when the distance is less than or equal to a third distance threshold, determining the operating mode of the power amplifier to be the first operating mode, when the distance is greater than the third distance threshold but less than a fourth distance threshold, determining the operating mode of the power amplifier to be the second operating mode, and when the distance is greater than or equal to the fourth distance threshold, determining the operating mode of the power amplifier to be the third operating mode;

wherein the first distance threshold and the third distance threshold are different from each other by a preset value, and the second distance threshold and the fourth distance threshold are different from each other by a preset value.

In order to avoid the ping-pong effect, in the embodiment of the present disclosure, the distance thresholds corresponding to the same operating mode are set to be different in the case that the distance between the UAV and the ground station increases and in the case that the distance between the UAV and the ground station decreases. That is, the first distance threshold and the third distance threshold are different from each other by a preset value, and the second distance threshold and the fourth distance threshold are different from each other by a preset value.

Table 2 shows a distance judgment rule set for avoiding the ping-pong effect in the embodiment of the present disclosure.

TABLE 2

| Distance Judgment Rule | | | |
|---|---|---|---|
| Distance threshold | Operating mode | | |
| Distance change trend | Low power | Medium power | High power |
| Distance increasing | 0-100 m | 100-300 m | ≥300 m |
| Distance decreasing | 0-95 m | 95-295 m | ≥295 m |

As shown in Table 2 above, in the embodiment of the present disclosure, the distance threshold between the UAV and the ground station when the distance increases is set to differ by 5 m from the distance threshold corresponding to the same operating mode when the distance decreases, so as to avoid the ping-pong effect. More particularly, in the case that the distance between the UAV and the ground station increases, the distance threshold corresponding to the low power operating mode is set to 0-100 m, and the distance threshold corresponding to the medium power operating mode is set to 100-300 m; and in the case that the distance between the UAV and the ground station decreases, the distance threshold corresponding to the low power operating mode is set to 0-95 m, and the distance threshold corresponding to the medium power operating mode is set to 95-295 m. When the distance between the UAV and the ground station increases from 80 m to 101 m, the operating mode of the power amplifier switches from the low power operating mode to the medium power operating mode. When the UAV continues flying and the distance between the UAV and the ground station decreases to 98 m, the operating mode of the power amplifier will still remain in the medium power operating mode. Only when the distance between the UAV and the ground station decreases to less than 95 m, the operating mode of the power amplifier will switch from the medium power operating mode to the low power operating mode.

Similarly, in the case that the distance between the UAV and the ground station increases, the second distance threshold is set to ≥300 m; and in the case that the distance between the UAV and the ground station decreases, the fourth distance threshold is set to ≥295 m. That is, the second distance threshold is different from the fourth distance threshold by 5 m. When the distance between the UAV and the ground station increases from 280 m to over 300 m, the operating mode of the power amplifier switches from the medium power operating mode to the high power operating mode. When the UAV continues flying and the distance between the UAV and the ground station decreases to 298 m, the operating mode of the power amplifier will still remain in the high power operating mode. Only when the distance between the UAV and the ground station decreases to less than 295 m, the operating mode of the power amplifier will switch from the high power operating mode to the medium power operating mode.

GPS satellites themselves and the propagation process of satellite signals will cause errors in GPS satellite positioning measurement. In order to eliminate GPS satellite positioning errors and improve the accuracy of UAV locating, the step of acquiring position information of the UAV comprising:
receiving GPS satellite positioning information;
receiving GPS correction information sent by the ground station, wherein the GPS correction information is determined by the ground station according to a GPS reference station whose position is known; and
correcting the GPS satellite positioning information according to the GPS correction information to obtain the position information of the UAV.

It should be noted that the ground station obtains GPS correction information according to a GPS reference station whose position is known and sends the GPS correction information to the UAV; the UAV corrects the GPS satellite positioning information according to the GPS correction information, and uses the corrected GPS satellite positioning information as the position information of the UAV.

Figure 2:
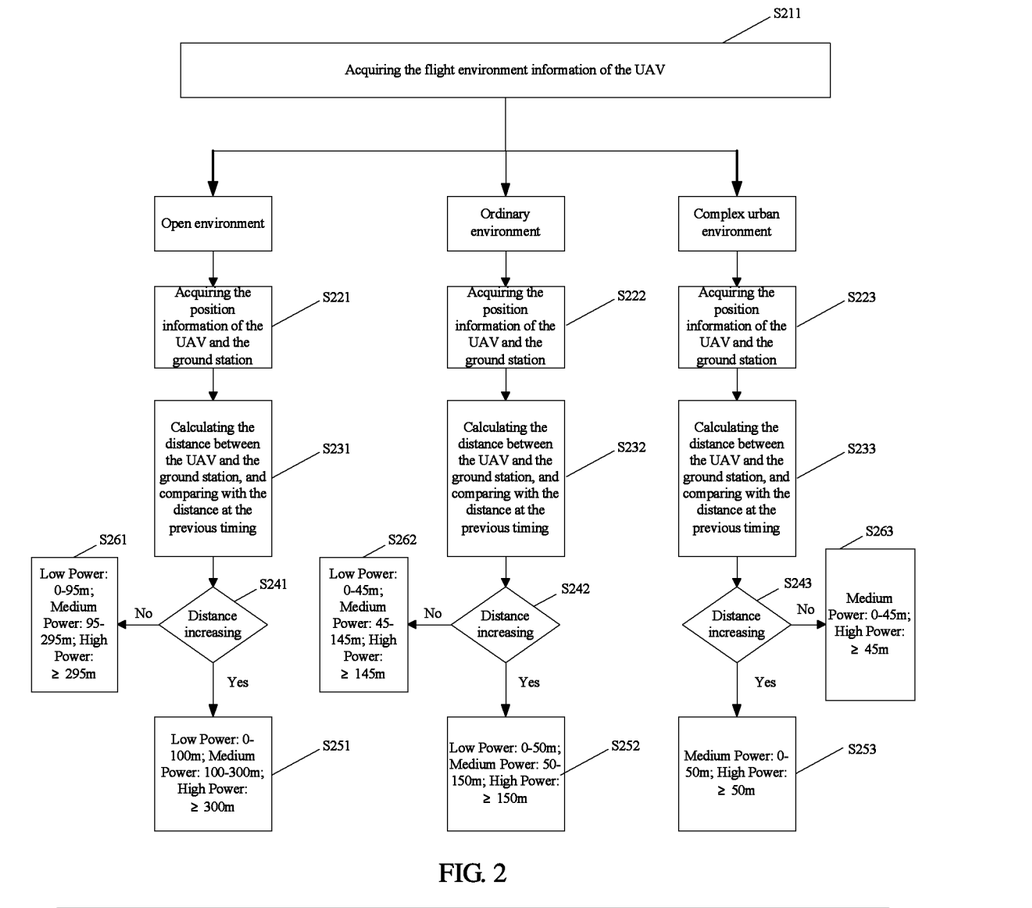
FIG. 2 is a schematic flowchart of a UAV communication method according to another embodiment of the present disclosure.

FIG. 2 is a schematic flowchart of a UAV communication method according to another embodiment of the present disclosure.

As shown in FIG. 2, the method of this embodiment of the present disclosure comprises:

S211: firstly, determining the flight environment of the UAV, which may be an open environment, an ordinary environment, or a complex urban environment.

When the flight environment information is an open environment,

S221: acquiring the position information of the UAV and the ground station; and

S231: calculating the distance between the UAV and the ground station according to the position information of the UAV and the ground station, and comparing the distance with the distance at the previous timing to determine the change trend of the distance between the UAV and the ground station;

Specifically, assuming that the first spatial coordinate of the UAV is (X1, Y1, Z1) and the second spatial coordinate of the ground station is (X2, Y2, Z2), the distance between the UAV and the ground station is:

$$L=\sqrt{(X1-X2)^2+(Y1-Y2)^2+(Z1-Z2)^2}.$$

S241: if the change trend of the distance between the UAV and the ground station is distance increasing, executing S251; otherwise, executing S261;

S251: if the distance between the UAV and the ground station is 0-100 m, sending a control signal to the power amplifier to switch to the low power operating mode; if the distance between the UAV and the ground station is 100-300 m, sending a control signal of the medium power operating mode to the power amplifier; if the distance between the UAV and the ground station is ≥300 m, sending a control signal of the high power operating mode to the power amplifier;

S261: if the distance between the UAV and the ground station is 0-95 m, sending a control signal of the low power operating mode to the power amplifier; if the distance between the UAV and the ground station is 95-295 m, sending a control signal of the medium power operating mode to the power amplifier; and if the distance between the UAV and the ground station is ≥295 m, sending a control signal of the high power operating mode to the power amplifier.

As shown in FIG. 2, when the flight environment information is an ordinary environment:

S222 and S232 are the same as S221 and S231 and are not repeatedly described here.

S242: if the change trend of the distance between the UAV and the ground station is distance increasing, executing S252; otherwise, executing S262;

S252: if the distance between the UAV and the ground station is 0-50 m, sending a control signal of the low power operating mode to the power amplifier; if the distance between the UAV and the ground station is 50-150 m, sending a control signal of the medium power operating mode to the power amplifier; and if the distance between the UAV and the ground station is ≥150 m, sending a control signal of the high power operating mode to the power amplifier;

S262: if the distance between the UAV and the ground station is 0-45 m, sending a control signal of the low power operating mode to the power amplifier; if the distance between the UAV and the ground station is 45-145 m, sending a control signal of the medium power operating mode to the power amplifier; and if the distance between the UAV and the ground station is ≥145 m, sending a control signal of the high power operating mode to the power amplifier.

As shown in FIG. 2, when the flight environment information is a complex urban environment:

S223 and S233 are the same as S221 and S231 and are not repeatedly described here.

S243: if the change trend of the distance between the UAV and the ground station is distance increasing, executing S253; otherwise, executing S263;

S253: if the distance between the UAV and the ground station is 0-50 m, sending a control signal of the medium power operating mode to the power amplifier; and if the distance between the UAV and the ground station is ≥50 m, sending a control signal of the high power operating mode to the power amplifier;

S263: if the distance between the UAV and the ground station is 0-45 m, sending a control signal of the medium power operating mode to the power amplifier; and if the distance between the UAV and the ground station is ≥45 m, sending a control signal of the high power operating mode to the power amplifier.

The distance judgment rule corresponding to the above method of FIG. 2 is shown in Table 3.

TABLE 3

Distance Judgment Rule

| Flight environment information | Distance threshold Distance change trend | Operating mode | | |
|---|---|---|---|---|
| | | Low power | Medium power | High power |
| Open environment | Increasing | 0-100 m | 100-300 m | ≥300 m |
| | Decreasing | 0-95 m | 95-295 m | ≥295 m |
| Ordinary environment | Increasing | 0-50 m | 50-150 m | ≥150 m |
| | Decreasing | 0-45 m | 45-145 m | ≥145 m |
| Complex urban environment | Increasing | None | 0-50 m | ≥50 m |
| | Decreasing | | 0-45 m | ≥45 m |

It should be noted that, as shown in Table 3, when the UAV is in a complex urban environment, the spatial attenuation of the wireless communication signal is large. Therefore, in order to ensure the normal transmission of UAV data, in this flight environment, the power amplifier of the UAV does not have the low power operating mode, and only the medium power operating mode and the high power operating mode are provided.

In the UAV communication method shown in FIG. 2, the distance judgment rule stores correspondences between the distance threshold, the environment attribute of the flight environment information, the distance change trend and the operating mode of the power amplifier.

The UAV communication method according to the embodiment of the present disclosure can dynamically adjust the operating mode of the power amplifier according to the actual distance between the UAV and the ground station, the environment attribute of the flight environment information, and the distance change trend, so that when the UAV transmits data to the ground station, the most suitable gain parameter threshold can be selected to perform power amplification of the RF transmitting signal. Therefore, the transmission quality of the RF transmitting signal can be ensured, and at the same time, the power consumption of the power amplifier can be reduced, and the flight endurance of the UAV can be increased.

In another embodiment of the present disclosure, in order to avoid the ping-pong effect, the method further comprises:

determining a distance change trend of the distance corresponding to the current moment with respect to the distance corresponding to the first moment, wherein the first moment is a historical moment that differs from the current moment by a first preset duration;

if the distance change trend of the current moment with respect to the first moment is opposite to the distance change trend of the first moment with respect to the second moment, wherein the second moment is a historical moment that differs from the first moment by a second preset duration, increasing or decreasing the first distance threshold and the second distance threshold by a preset value.

It should be noted that, in the embodiment of the present disclosure, in order to avoid the ping-pong effect, if the distance change trend of the current moment with respect to the first moment is opposite to the distance change trend of the first moment with respect to the second moment, the original distance threshold may be automatically increased or decrease by a preset value.

Figure 3:
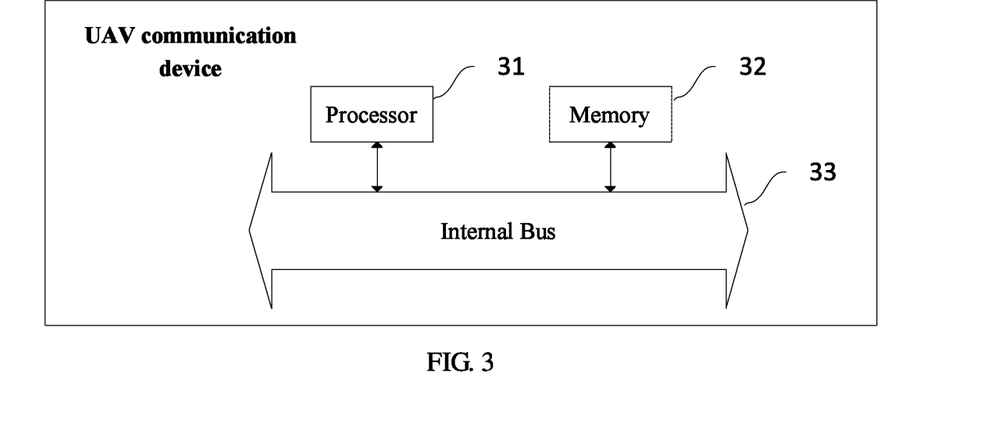
FIG. 3 is a schematic structural diagram of a UAV communication device according to an embodiment of the present disclosure.

FIG. 3 is a schematic structural diagram of a UAV communication device according to an embodiment of the present disclosure. As shown in FIG. 3, the UAV communication device of the embodiment of the present disclosure comprises a processor 31 and a memory 32 which are communicatively connected via an internal bus 33, the memory 32 stores a computer program executable by the processor 31, and when the computer program is executed by the processor, the following steps are carried out:

acquiring position information of the UAV and position information of a ground station, wherein the ground station and the UAV are communicated wirelessly;

determining a distance between the UAV and the ground station according to the position information of the UAV and the position information of the ground station;

determining an operating mode of a power amplifier on the UAV according to the distance and a preset distance judgment rule, wherein the distance judgment rule stores correspondences between distance thresholds and operating modes of the power amplifier; and sending a control signal corresponding to the operating mode to the power amplifier, controlling the power amplifier to select a gain parameter threshold corresponding to the operating mode according to the control signal and to perform power amplification of a RF transmit signal according to the gain parameter threshold; and sending the amplified signal to the ground station.

Optionally, operating modes of the power amplifier include a first operating mode, a second operating mode and a third operating mode, wherein the gain parameter threshold of the first operating mode is less than the gain parameter threshold of the second operating mode, and the gain parameter threshold of the second operating mode is less than the gain parameter threshold of the third operating mode; and the step of determining an operating mode of a power amplifier on the UAV according to the distance and a preset distance judgment rule comprises:

when the distance is less than or equal to a first distance threshold, determining the operating mode of the power amplifier to be the first operating mode;

when the distance is greater than the first distance threshold but less than a second distance threshold, determining the operating mode of the power amplifier to be the second operating mode; and when the distance is greater than or equal to the second distance threshold, determining the operating mode of the power amplifier to be the third operating mode.

Optionally, the distance judgment rule further includes environment attributes, and the method further comprising:

acquiring flight environment information of the UAV; and determining an environment attribute which the flight environment information belongs to according to the flight environment information, and selecting a distance judgment rule corresponding to the environment attribute which the flight environment information belongs to.

Optionally, the distance judgment rule further includes distance change trend attributes, and the method further comprises:

acquiring a distance change trend between the UAV and the ground station within a preset duration; and selecting a distance judgment rule corresponding to the distance change trend according to the distance change trend.

Optionally, the distance change trends include distance increasing and distance decreasing; and the step of determining an operating mode of a power amplifier on the UAV according to the distance and a preset distance judgment rule particularly comprises:

in the case that the distance between the UAV and the ground station increases, when the distance is less than or equal to a first distance threshold, determining the operating mode of the power amplifier to be the first operating mode, when the distance is greater than the first distance threshold but less than a second distance threshold, determining the operating mode of the power amplifier to be the second operating mode, and when the distance is greater than or equal to the second distance threshold, determining the operating mode of the power amplifier to be the third operating mode; and in the case that the distance between the UAV and the ground station decreases, when the distance is less than or equal to a third distance threshold, determining the operating mode of the power amplifier to be the first operating mode, when the distance is greater than the third distance threshold but less than a fourth distance threshold, determining the operating mode of the power amplifier to be the second operating mode, and when the distance is greater than or equal to the fourth distance threshold, determining the operating mode of the power amplifier to be the third operating mode;

wherein the first distance threshold and the third distance threshold are different from each other by a preset value, and the second distance threshold and the fourth distance threshold are different from each other by a preset value.

Optionally, the step of acquiring position information of the UAV comprises:

receiving GPS satellite positioning information;

receiving GPS correction information sent by the ground station, wherein the GPS correction information is determined by the ground station according to a GPS reference station whose position is known; and correcting the GPS satellite positioning information according to the GPS correction information to obtain the position information of the UAV.

Figure 4:
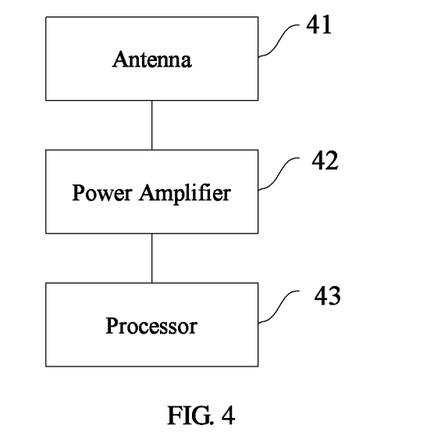
FIG. 4 is a schematic block diagram of a UAV according to an embodiment of the present disclosure.

FIG. 4 is a schematic block diagram of a UAV according to an embodiment of the present disclosure. As shown in FIG. 4, the UAV according to the embodiment of the present disclosure comprises a processor 43, a power amplifier 42, and an antenna 41.

The processor 43 is configured to acquire position information of the UAV and position information of a ground station, wherein the ground station and the UAV are communicated wirelessly; determine a distance between the UAV and the ground station according to the position information of the UAV and the position information of the ground station; determine an operating mode of a power amplifier on the UAV according to the distance and a preset distance judgment rule, wherein the distance judgment rule stores correspondences between distance thresholds and operating modes of the power amplifier; and send a control signal corresponding to the operating mode to the power amplifier.

The power amplifier 42 is configured to select a gain parameter threshold corresponding to the operating mode according to the control signal, and perform power amplification of a RF transmit signal according to the gain parameter threshold.

The antenna 41 is configured to send the amplified signal to the ground station.

In practical applications, the power amplifier 42 is an indirect current feedback power adjustable amplifier, and the processor 43 changes the resistance of the gain adjustment resistor of the power amplifier 42 by sending a control signal to the power amplifier 42, thereby changing the gain parameter threshold of the power amplifier 42.

According to the UAV of the embodiment of the present disclosure, the distance between the UAV and the ground station is determined by acquiring the position information of the UAV and the position information of the ground station; the operating mode of the power amplifier of the UAV is determined according to the distance between the UAV and the ground station and the preset distance judgment rule; after the operating mode of the power amplifier of the UAV is determined, a control signal is sent to the power amplifier, and the power amplifier is controlled to perform power amplification of the RF transmitting signals according to the gain parameter threshold corresponding to the operating mode.

Unlike the technical solutions of the prior art in which high power amplifiers are always used to ensure that the flight state data and the collected image data of the UAV can be transmitted back to the ground station over a long distance, in the present disclosure, the distance between the UAV and the ground station is firstly determined, and the operating mode of the power amplifier can be dynamically adjusted according to the actual distance between the UAV and the ground station, so that when the UAV transmits data to the ground station, the most suitable gain parameter threshold can be selected to perform power amplification of the RF transmitting signal. For example, when the distance between the UAV and the ground station is small, the power amplifier is controlled to operate in a low power operating mode; and when the distance between the UAV and the ground station is large, the power amplifier is controlled to operate in a high power operating mode. Thereby, the transmission quality of the RF transmission signal can be ensured, and at the same time, the power consumption of the power amplifier can be reduced, and the flight endurance of the UAV can be increased.

Optionally, the UAV according to the embodiment of the present disclosure further comprises a locating module connected to the processor. The locating module is configured to acquire position information of the UAV and the ground station, and sends the position information to the processor. In practical applications, the locating module is preferably a GPS module, and may be other devices for locating, which is not limited in the present disclosure.

Figure 5:
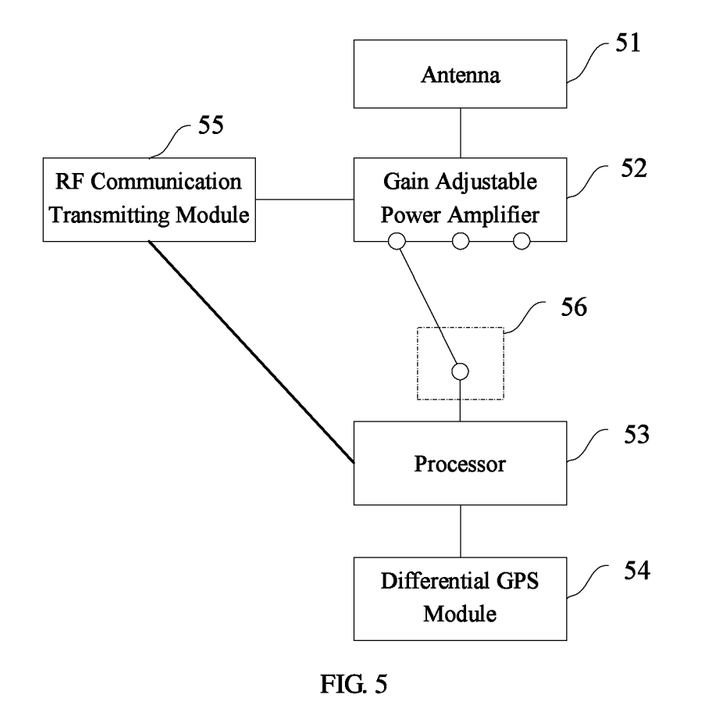
FIG. 5 is a schematic structural diagram of a UAV according to another embodiment of the present disclosure.

As shown in FIG. 5, the UAV according to the embodiment of the present disclosure comprises: a processor 53, a gain adjustable power amplifier 52, an antenna 51, and a differential GPS module 54 connected to the processor.

The differential GPS module 54 is configured to receive GPS satellite positioning information, receive GPS correction information sent by the ground station, correct the GPS satellite positioning information according to the GPS correction information to obtain the position information of the UAV, and send the position information of the UAV to the processor 53; wherein the GPS correction information is determined by the ground station according to a GPS reference station whose position is known.

Optionally, the UAV further comprises an RF communication transmitting module 55. The input end of the RF communication transmitting module 55 is connected to the processor 53, and the output end of the RF communication transmitting module 55 is connected to the gain adjustable power amplifier 52. The RF communication transmitting module 55 is configured to send an RF transmitting signal to the gain adjustable power amplifier 52 according to a control signal sent from the processor 53. The RF communication transmitting module 55 comprises a data transmission RF module and an image transmission RF module.

In practical applications, the operating frequency band of the RF communication transmitting module 55 is 5.8 GHz. The data transmission RF module is configured to transmit the flight state data of the UAV, and the image transmission radio frequency module is configured to transmit the image data collected by the UAV.

The UAV also comprises a gain switch 56 connected to a gain adjustable power amplifier 52. The processor 53 controls the gain switch 56 according to the control signal to connect to different control ports of the gain adjustable power amplifier 52. Different control ports correspond to different gain parameter thresholds.

In the embodiment of the present disclosure, the gain adjustable power amplifier 52 comprises a first control port, a second control port, and a third control port. When the processor is connected to the first control port of the gain adjustable power amplifier 52 through the gain switch 56, the operating mode of the gain adjustable power amplifier 52 is the first operating mode; when the processor is connected to the second control port of the gain adjustable power amplifier 52 through the gain switch 56, the operating mode of the gain adjustable power amplifier 52 is the second operating mode; and when the processor is connected to the third control port of the gain adjustable power amplifier 52 through the gain switch 56, the operating mode of the gain adjustable power amplifier 52 is the third operating mode.

In sum, according to the technical solutions of the present disclosure, the distance between the UAV and the ground station is determined by acquiring the position information of the UAV and the position information of the ground station; the operating mode of the power amplifier of the UAV is determined according to the distance and the preset distance judgment rule; after the operating mode of the power amplifier of the UAV is determined, a control signal is sent to the power amplifier, and the power amplifier is controlled to perform power amplification of the RF transmitting signals according to the gain parameter threshold corresponding to the operating mode.

Unlike the technical solutions of the prior art in which high power amplifiers are always used to ensure that the flight state data and the collected image data of the UAV can be transmitted back to the ground station over a long distance, in the present disclosure, the distance between the UAV and the ground station is firstly determined, and the operating mode of the power amplifier can be dynamically adjusted according to the actual distance between the UAV and the ground station, so that when the UAV transmits data to the ground station, the most suitable gain parameter threshold can be selected to perform power amplification of the RF transmitting signal. For example, when the distance between the UAV and the ground station is small, the power amplifier is controlled to operate in a low power operating mode; and when the distance between the UAV and the ground station is large, the power amplifier is controlled to operate in a high power operating mode. Therefore, the transmission quality of the RF transmitting signal can be ensured, and at the same time, the power consumption of the power amplifier can be reduced, and the flight endurance of the UAV can be increased.

A person skilled in the art should understand that the embodiments of the present disclosure may be provided as a method, a system, or a computer program product. Thus, the present disclosure may take the form of an entirely hardware embodiment, an entirely software embodiment, or an embodiment combining software and hardware. Furthermore, the present disclosure may take the form of a computer program product embodied on one or more computer-usable storage media (including, but not limited to, disk storage, CD-ROMs, optical memories, etc.) having computer-usable program code recorded thereon.

The present disclosure is described with reference to flowcharts and/or block diagrams of the method, the device (system), and the computer program product according to the embodiment of the present disclosure. It should be understood that each flow and/or block in the flowcharts and/or block diagrams, and combinations of the flows and/or blocks in the flowcharts and/or block diagrams may be implemented by computer program instructions. The computer program instructions may be provided to a processor of a general purpose computer, a special purpose computer, an embedded processor, or other programmable data processing device to generate a machine so that a device for implementing the functions specified in one or more blocks of a flowchart or multiple flows and/or block diagrams of a flowchart can be generated by instructions executed by a processor of a computer or other programmable data processing device.

It should be noted that the terms "comprise", "include" or any other variations thereof are intended to cover nonexclusive incorporations, so that a process, method, article, or device comprising a series of elements does not only comprise those elements listed, but also comprises other elements which are not listed, or the elements that are inherent to such a process, method, article, or device. In the case that there is no more limitation, an element defined by the wording "comprising a" does not exclude the additional same element in the process, method, article or device that comprises the element.

In the description of the present disclosure, many specific details are illustrated. However, it can be understood that embodiments of the present disclosure may be implemented without those specific details. In some instances, well-known methods, structures and techniques are not shown in detail in order not to obscure the understanding of this description. Similarly, it should be understood that in order to simplify the disclosure of the present disclosure and help understand one or more of the various inventive aspects, in the above description of the exemplary embodiments of the present disclosure, various features of the present disclosure are sometimes grouped together in a single embodiment, figure, or description thereof. However, the disclosed method should not be interpreted as reflecting the intention that the claimed present disclosure requires more features than those expressly recited in each claim. More exactly, as the claims reflect, inventive aspects include features less than all the features of a single foregoing disclosed embodiment. Thus, the claims following the detailed description are hereby expressly incorporated into this detailed description, with each claim being an independent embodiment of the present disclosure.

The description above is merely specific embodiments of the present disclosure. With the foregoing teachings of the present disclosure, a person skilled in the art may make other improvements or modifications based on the foregoing embodiments. A person skilled in the art should understand that the specific description above is only for better explaining the present disclosure, and the protection scope of the present disclosure should be subject to the protection scope of the claims.

What is claimed is:

1. An unmanned aerial vehicle (UAV) communication method, comprising:

acquiring position information of the UAV and position information of a ground station, wherein the ground station and the UAV are communicated wirelessly;

determining a distance between the UAV and the ground station according to the position information of the UAV and the position information of the ground station;

determining an operating mode of a power amplifier on the UAV according to the distance and a distance judgment rule, wherein the distance judgment rule includes distance change trend attributes and stores correspondences between distance thresholds and operating modes of the power amplifier;

sending a control signal corresponding to the operating mode to the power amplifier;

controlling the power amplifier to select a gain parameter threshold corresponding to the operating mode according to the control signal and to perform power amplification of a RF transmitting signal according to the gain parameter threshold; and sending the amplified signal to the ground station;

acquiring a distance change trend of the distance between the UAV and the ground station within a preset duration;

selecting a distance judgment rule corresponding to the distance change trend according to the distance change trend;

determining a distance change trend of a distance corresponding to a current moment with respect to a distance corresponding to a first moment, wherein the first moment is a historical moment that differs from the current moment by a first preset duration; and if the distance change trend of the current moment with respect to the first moment is opposite to a distance change trend of the first moment with respect to a second moment, wherein the second moment is a historical moment that differs from the first moment by a second preset duration, increasing or decreasing an original distance threshold by a preset value.

2. The method according to claim 1, wherein
operating modes of the power amplifier include a first operating mode, a second operating mode and a third operating mode, wherein the gain parameter threshold of the first operating mode is less than the gain parameter threshold of the second operating mode, and the gain parameter threshold of the second operating mode is less than the gain parameter threshold of the third operating mode;

the step of determining an operating mode of a power amplifier on the UAV according to the distance and a preset distance judgment rule comprises:

when the distance is less than or equal to a first distance threshold, determining the operating mode of the power amplifier to be the first operating mode;

when the distance is greater than the first distance threshold but less than a second distance threshold, determining the operating mode of the power amplifier to be the second operating mode; and when the distance is greater than or equal to the second distance threshold, determining the operating mode of the power amplifier to be the third operating mode.

3. The method according to claim 1, wherein
the distance judgment rule further includes environment attributes, and
the method further comprising:
acquiring flight environment information of the UAV; and
determining an environment attribute which the flight environment information belongs to according to the flight environment information, and selecting a distance judgment rule corresponding to the environment attribute which the flight environment information belongs to.

4. The method according to claim 2, wherein
the distance judgment rule further includes distance change trend attributes, and
the method further comprising:
acquiring a distance change trend of the distance between the UAV and the ground station within a preset duration; and
selecting a distance judgment rule corresponding to the distance change trend according to the distance change trend.

5. The method according to claim 4, wherein
the distance change trends include distance increasing and distance decreasing; and
the step of determining an operating mode of a power amplifier on the UAV according to the distance and a preset distance judgment rule particularly comprises:
in the case that the distance between the UAV and the ground station increases, when the distance is less than or equal to the first distance threshold, determining the operating mode of the power amplifier to be the first operating mode, when the distance is greater than the first distance threshold but less than the second distance threshold, determining the operating mode of the power amplifier to be the second operating mode, and when the distance is greater than or equal to the second distance threshold, determining the operating mode of the power amplifier to be the third operating mode; and
in the case that the distance between the UAV and the ground station decreases, when the distance is less than or equal to a third distance threshold, determining the operating mode of the power amplifier to be the first operating mode, when the distance is greater than the third distance threshold but less than a fourth distance threshold, determining the operating mode of the power amplifier to be the second operating mode, and when the distance is greater than or equal to the fourth distance threshold, determining the operating mode of the power amplifier to be the third operating mode;
wherein the first distance threshold and the third distance threshold are different from each other by a preset value, and the second distance threshold and the fourth distance threshold are different from each other by a preset value.

6. The method according to claim 1, wherein the step of acquiring position information of the UAV comprises:
receiving GPS satellite positioning information;
receiving GPS correction information sent by the ground station, wherein the GPS correction information is determined by the ground station according to a GPS reference station whose position is known; and
correcting the GPS satellite positioning information according to the GPS correction information to obtain the position information of the UAV.

7. An unmanned aerial vehicle (UAV) communication device, comprising a processor and a memory which are communicatively connected via an internal bus, wherein the memory stores a computer program executable by the processor, and when the computer program is executed by the processor, the following steps are carried out:

acquiring position information of the UAV and position information of a ground station, wherein the ground station and the UAV are communicated wirelessly;

determining a distance between the UAV and the ground station according to the position information of the UAV and the position information of the ground station;

determining an operating mode of a power amplifier on the UAV according to the distance and a distance judgment rule, wherein the distance judgment rule includes distance change trend attributes and stores correspondences between distance thresholds and operating modes of the power amplifier;

sending a control signal corresponding to the operating mode to the power amplifier controlling the power amplifier to select a gain parameter threshold corresponding to the operating mode according to the control signal and to perform power amplification of a RF transmitting signal according to the gain parameter threshold; and sending the amplified signal to the ground station;

acquiring a distance change trend of the distance between the UAV and the ground station within a preset duration;

selecting a distance judgment rule corresponding to the distance change trend according to the distance change trend;

determining a distance change trend of a distance corresponding to a current moment with respect to a distance corresponding to a first moment, wherein the first moment is a historical moment that differs from the current moment by a first preset duration; and if the distance change trend of the current moment with respect to the first moment is opposite to a distance change trend of the first moment with respect to a second moment, wherein the second moment is a historical moment that differs from the first moment by a second preset duration, increasing or decreasing an original distance threshold by a preset value.

8. The device according to claim 7, wherein operating modes of the power amplifier include a first operating mode, a second operating mode and a third operating mode, wherein the gain parameter threshold of the first operating mode is less than the gain parameter threshold of the second operating mode, and the gain parameter threshold of the second operating mode is less than the gain parameter threshold of the third operating mode;

the step of determining an operating mode of a power amplifier on the UAV according to the distance and a preset distance judgment rule comprises:

when the distance is less than or equal to a first distance threshold, determining the operating mode of the power amplifier to be the first operating mode;

when the distance is greater than the first distance threshold but less than a second distance threshold, determining the operating mode of the power amplifier to be the second operating mode; and when the distance is greater than or equal to the second distance threshold, determining the operating mode of the power amplifier to be the third operating mode.

9. The device according to claim 8, wherein the distance judgment rule further includes distance change trend attributes, and when the computer program is executed by the processor, the following steps are further carried out:

acquiring a distance change trend of the distance between the UAV and the ground station within a preset duration; and selecting a distance judgment rule corresponding to the distance change trend according to the distance change trend.

10. The device according to claim 9, wherein the distance change trends include distance increasing and distance decreasing; and the step of determining an operating mode of a power amplifier on the UAV according to the distance and a preset distance judgment rule particularly comprises:

in the case that the distance between the UAV and the ground station increases, when the distance is less than or equal to the first distance threshold, determining the operating mode of the power amplifier to be the first operating mode, when the distance is greater than the first distance threshold but less than the second distance threshold, determining the operating mode of the power amplifier to be the second operating mode, and when the distance is greater than or equal to the second distance threshold, determining the operating mode of the power amplifier to be the third operating mode; and in the case that the distance between the UAV and the ground station decreases, when the distance is less than or equal to a third distance threshold, determining the operating mode of the power amplifier to be the first operating mode, when the distance is greater than the third distance threshold but less than a fourth distance threshold, determining the operating mode of the power amplifier to be the second operating mode, and when the distance is greater than or equal to the fourth distance threshold, determining the operating mode of the power amplifier to be the third operating mode;

wherein the first distance threshold and the third distance threshold are different from each other by a preset value, and the second distance threshold and the fourth distance threshold are different from each other by a preset value.

11. The device according to claim 7, wherein the step of acquiring position information of the UAV comprises:

receiving GPS satellite positioning information;

receiving GPS correction information sent by the ground station, wherein the GPS correction information is determined by the ground station according to a GPS reference station whose position is known; and correcting the GPS satellite positioning information according to the GPS correction information to obtain the position information of the UAV.

12. The device according to claim 7, wherein the distance judgment rule further includes environment attributes, and when the computer program is executed by the processor, the following steps are further carried out:

acquiring flight environment information of the UAV; and determining an environment attribute which the flight environment information belongs to according to the flight environment information, and selecting a distance judgment rule corresponding to the environment attribute which the flight environment information belongs to.

13. An unmanned aerial vehicle (UAV), comprising:

a processor;

a power amplifier; and an antenna;

wherein the processor is configured to:

acquire position information of the UAV and position information of a ground station, wherein the ground station and the UAV are communicated wirelessly;

determine a distance between the UAV and the ground station according to the position information of the UAV and the position information of the ground station;

determine an operating mode of a power amplifier on the UAV according to the distance and a distance judgment rule, wherein the distance judgment rule includes change trend attributes and stores correspondences between distance thresholds and operating modes of the power amplifier; and send a control signal corresponding to the operating mode to the power amplifier;

acquire a distance change trend of the distance between the UAV and the ground station within a preset duration, and select a distance judgment rule corresponding to the distance change trend according to the distance change trend;

determine a distance change trend of a distance corresponding to a current moment with respect to a distance corresponding to a first moment, wherein the first moment is a historical moment that differs from the current moment by a first preset duration; and if the distance change trend of the current moment with respect to the first moment is opposite to a distance change trend of the first moment with respect to a second moment, wherein the second moment is a historical moment that differs from the first moment by a second preset duration, increase or decrease an original distance threshold by a preset value;

wherein the power amplifier is configured to select a gain parameter threshold corresponding to the operating mode according to the control signal, and perform power amplification of the RF transmitting signal according to the gain parameter threshold; and wherein the antenna is configured to send the amplified signal to the ground station.

14. The UAV according to claim 13, further comprising a differential GPS module connected to the processor; wherein the differential GPS module is configured to receive GPS satellite positioning information, receive GPS correction information sent by the ground station, correct the GPS satellite positioning information according to the GPS correction information to obtain the position information of the UAV, and send the position information of the UAV to the processor; and the GPS correction information is determined by the ground station according to a GPS reference station whose position is known.

15. The UAV according to claim 13, further comprising a RF communication transmitting module, an input end of which is connected to the processor and an output end of which is connected to the power amplifier;

the RF communication transmitting module is configured to send an RF transmitting signal to the power amplifier according to a control signal sent from the processor; and the RF communication transmitting module comprises a data transmission RF module and an image transmission RF module.

16. The UAV according to claim 13, wherein the power amplifier is a gain adjustable power amplifier; and the UAV further comprises a gain switch connected to the gain adjustable power amplifier, and the processor controls the gain switch according to the control signal to connect to different control ports of the gain adjustable power amplifier, and the different control ports correspond to different gain parameter thresholds.

* * * * *